Sept. 22, 1953     O. A. FULLER     2,652,632

GAUGE

Filed May 26, 1951

INVENTOR.
ORLA A. FULLER.
BY
Lockwood, Hahn, Galt & Woodard,
ATTORNEYS.

Patented Sept. 22, 1953

2,652,632

UNITED STATES PATENT OFFICE 2,652,632

GAUGE

Orla A. Fuller, Indianapolis, Ind.

Application May 26, 1951, Serial No. 228,436

3 Claims. (Cl. 33—170)

The present invention relates to improvements in measuring gages and has for one of its objects that of providing a measuring gage to be used for various purposes.

One of the objects of the invention is to provide a measuring gage which may be used as a height gage or an inside diameter gage, or may be used for positioning a cutting tool relatively to the work for the purpose of cutting predetermined lengths of material or for cutting grooves at predetermined points longitudinally of the material.

A further object of my invention is that of providing a gage having the above advantages and characteristics which may be easily adjusted and easily manufactured and used.

For the purpose of disclosing the invention I have illustrated an embodiment thereof in the accompanying drawings in which Fig. 1 is a top plan view of a gage embodying my invention.

Figure 1:
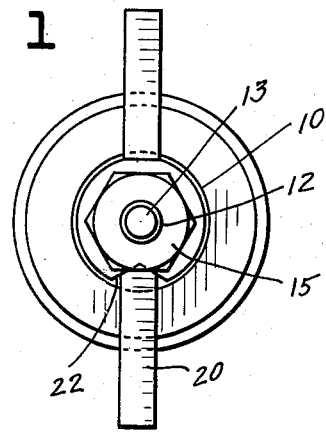
Figure 3:
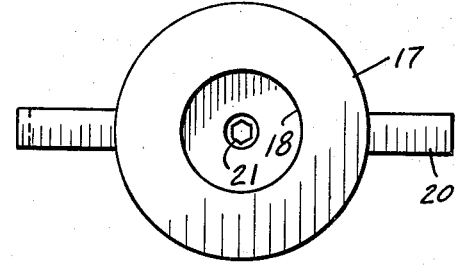
Fig. 3 is a bottom plan view.
Figure 2:
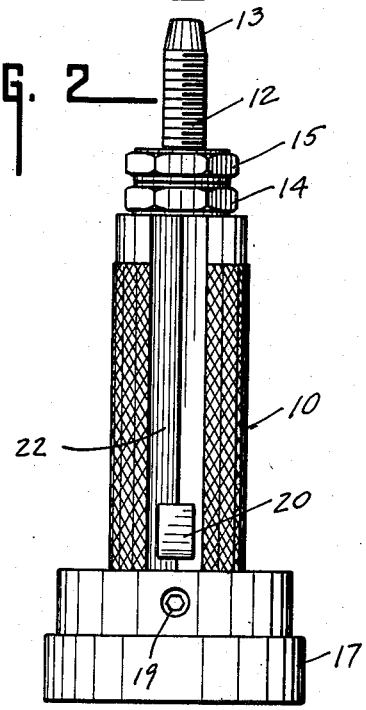
Fig. 2 is a side elevation thereof.
Figure 4:
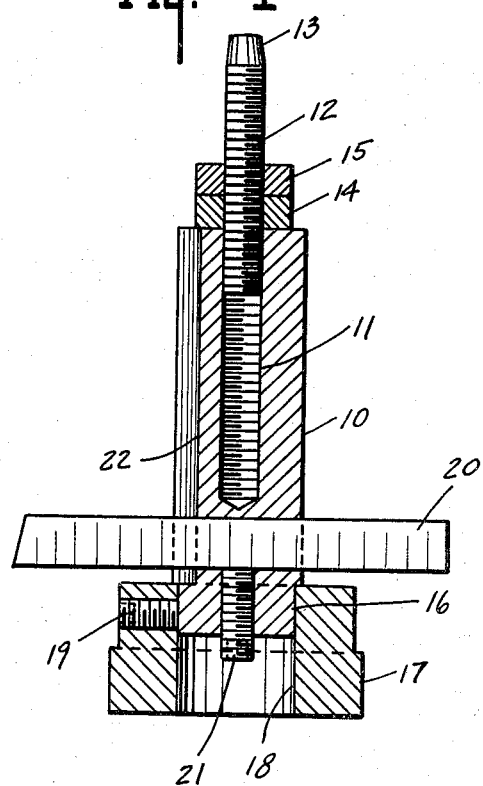
Fig. 4 is a longitudinal sectional view of the gage.

In the embodiment of the invention illustrated I provide a preferably cylindrical body 10, which is axially bored as at 11, the bore being screw threaded for the purpose of receiving and adjustable screw 12 having a contact end portion 13. This screw 12 may be adjusted by screwing the same into or out of the bore 11 and may be locked in its adjusted position through the medium of a nut 14, and a lock nut 15.

The body 10 is slightly reduced in diameter at its base as at 16 and receives thereon a base or rest 17 centrally bored as at 18 to receive the reduced portion 16. This base is secured in position through means of a locking screw 19 radially entering the base and adapted to contact the portion 16.

The body 10 at a point below the end of the threaded bore 11, and at a point above the base 17, is provided with a transverse opening adapted to receive a cross member 20 adapted to be secured in position through the medium of a locking screw 21 threaded into the bottom of the body 10 and engaging one edge of the cross member 20. As will be observed, the face of the cross member that is proximate to the free end of screw 12 is flat and at right angles to the longitudinal axis of the gage body.

One side of the body 10 is longitudinally grooved at at 22.

In use if the gage is adapted to be used as a height gage, it is placed in position with the base resting on the table or part of the machine on which the work is adapted to be performed; and the member 12 is adjusted threadedly as to height, being locked in this position through the medium of the nuts 14 and 15. When the height is once determined in this manner, the gage may be repeatedly used in connection with the machine of similar pieces of material.

If the gage is adapted to be used as an inside diameter gage, the cross member 20 is removed, the base 17 is removed and the lock screw 21 is moved outwardly far enough to make a contact point at that end, with the threaded screw 12 adjusted to make contact at the opposite end.

It frequently is necessary to use a gage as a so-called "positioning gage" in connection with the cutting or grooving of stock. In such cases it is necessary to know to what point on the stock the grooving is to extend, or at what point the stock is to be cut. With the present invention this can readily be accomplished by adjusting the screw 12 until its end is the same distance from the proximate face of the cross member as the desired length of grooving to be turned in the stock. Then the gage is placed upon the stock with one arm of the cross member lying flush with the end surface of the stock. The body of the gage will be parallel to the stock but the cross arm will be at right angles thereto. Next the stock is moved into the lathe or other cutting instrument until the end of screw 12 makes contact therewith. Then the gage is removed and the stock locked in that position. The cut or groove may then be turned with assurance that it will extend only to the desired point.

In order to facilitate the above steps, particularly where the stock is cylindrical, there is provided a longitudinal groove 22 in the body of the gage. This is provided since a round article such as body 10 cannot easily be positioned and held upon another round article such as cylindrical stock. But with the grooving, the gage is permitted to lie closely adjacent even cylindrical stock, which eases the problem of holding it in the desired position while the stock is being moved into the lathe to the point where the screw 12 makes contact therewith. It will be observed that the cross bar projects through the grooved portion. The two thus cooperate in seating the gage upon the stock so that the proper grooving or cutting distance may be measured.

The invention claimed is:

1. A gage comprising a cylindrical body having an axial bore internally threaded, an adjustable gaging screw threaded into said bore, a supporting base removably secured to the end of said body opposite said adjusting screw, and a cross member removably extending through said body at right angles thereto adjacent the removable base, the face of said member that is proximate to the free end of said screw being flat.

2. A gage comprising a substantially cylindrical body having an internally threaded axial bore, an adjusting screw threaded into said bore, a cross member removably extending through the body and therebeyond, the face of said member that is proximate to the free end of said screw being flat and at right angles to the longitudinal axis of said body, and said body having a longitudinally extending groove in its outer surface.

3. A gage structure comprising a cylindrical body having an internally threaded axial bore, an adjusting screw threaded into said bore, means for locking said screw in a predetermined adjusted position, a base for supporting said body removably secured to the end thereof opposite said adjusting screw, a cross member removably secured in said body and extending therethrough and therebeyond at right angles to said body and at a point beyond said base, and a locking screw detachably securing said cross member in said base insertable in the end of the body opposite said adjusting screw.

ORLA A. FULLER.

References Cited in the file of this patent

UNITED STATES PATENTS

| Number | Name | Date |
|---|---|---|
| 1,226,574 | Nielson | May 15, 1917 |
| 1,322,302 | Knob | Nov. 18, 1919 |
| 1,912,027 | Barrowman | May 30, 1933 |
| 2,445,060 | Gearhart | July 13, 1948 |